United States Patent [19]
Burney

[11] Patent Number: 5,767,993
[45] Date of Patent: *Jun. 16, 1998

[54] HOLOGRAPHIC DISPLAY TRANSMITTING DEVICE

[76] Inventor: Michael Burney, 424 9th St., Santa Monica, Calif. 90402

[*] Notice: The term of this patent shall not extend beyond the expiration date of Pat. No. 5,381,249.

[21] Appl. No.: 370,897

[22] Filed: Jan. 10, 1995

Related U.S. Application Data

[63] Continuation-in-part of Ser. No. 965,884, Oct. 23, 1992, Pat. No. 5,381,249, which is a continuation-in-part of Ser. No. 102,780, Sep. 23, 1987, Pat. No. 5,184,232, which is a continuation-in-part of Ser. No. 919,551, Oct. 15, 1986, abandoned, which is a continuation-in-part of Ser. No. 788,248, Oct. 17, 1985, abandoned.

[51] Int. Cl.$^6$ .................................................. G03H 1/22
[52] U.S. Cl. ........................... 359/32; 359/1; 359/34; 348/40; 349/60
[58] Field of Search .................. 359/9, 15, 1, 32–35; 348/40, 41; 385/43, 116; 349/60

[56] References Cited

U.S. PATENT DOCUMENTS

| | | | |
|---|---|---|---|
| 4,359,758 | 11/1982 | Teacherson | 348/40 |
| 4,376,950 | 3/1983 | Brown et al. | 348/40 |
| 5,150,231 | 9/1992 | Iwamoto et al. | 349/60 |

*Primary Examiner*—Paul M. Dzierzynski
*Assistant Examiner*—Darren E. Schuberg
*Attorney, Agent, or Firm*—Koda & Androlia

[57] ABSTRACT

A holographic apparatus for continually sensing, transmitting and reconstructing a three-dimensional image including a device for receiving a holographic interference pattern such as a video camera, a device for creating a holographic interference pattern on the receiving device, a device for focusing the interference pattern on the input of the receiving device, a device for transmitting the received holographic interference pattern including a device such as a computer, a device for converting the transmitted holographic interference pattern to a holographic interference pattern which is representative of the three-dimensional image such as an LCD and a source of coherent light illuminating the holographic interference pattern on the converting means to reconstruct the three-dimensional image.

17 Claims, 8 Drawing Sheets

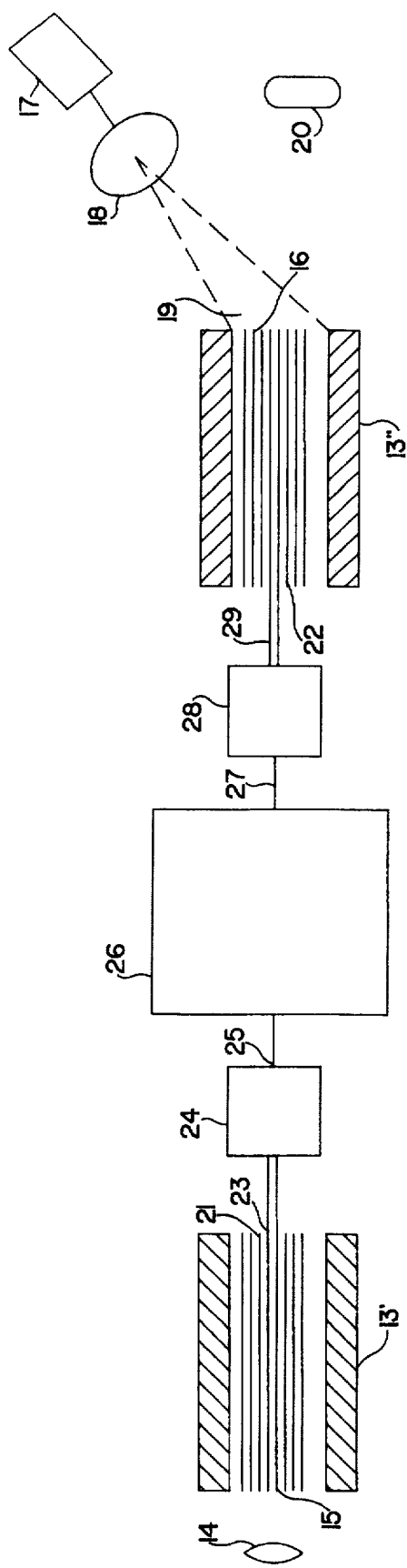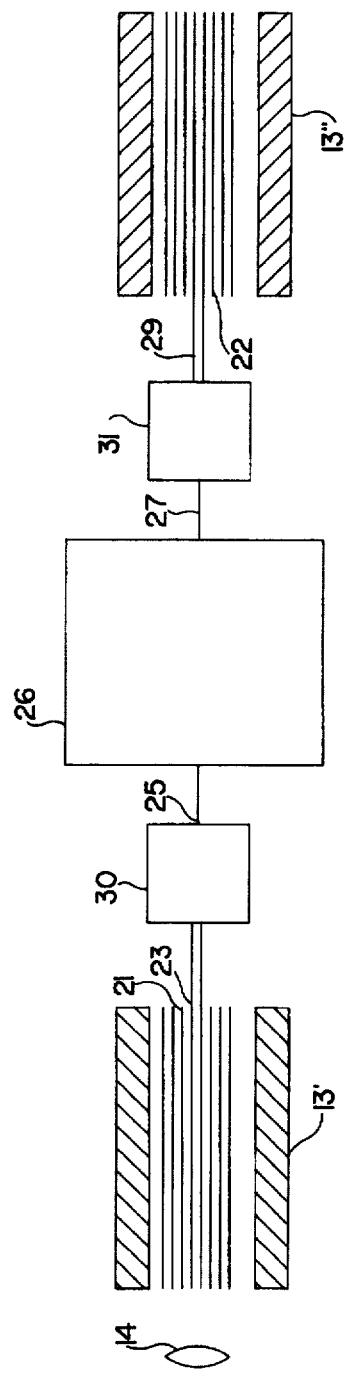

HOLOGRAPHIC DISPLAY TRANSMITTING DEVICE

This is a continuation-in-part of application Ser. No. 07/965,884, filed Oct. 23, 1992, now U.S. Pat. No. 5,381,249, which is a continuation-in-part of Ser. No. 102,780, Sept. 23, 1987, now U.S. Pat. No. 5,184,232, which is a continuation-in-part of Ser. No. 919,551, Oct. 15, 1986, abandoned, which is a continuation-in-part of Ser. No. 788,248, Oct. 17, 1985, abandoned.

BACKGROUND OF THE INVENTION

1. Field of the Invention

This invention relates to the process by which three-dimensional images or objects, moving or stationary, may be transformed and transmitted, and then reconstructed for viewing purposes by the use of optical wavelength reconstruction techniques; and particularly to the use of holography for such purposes.

2. Prior Art

The process of optical wavelength reconstruction is generally referred to as holography. Techniques for producing holograms vary, but in essence they entail what is shown in FIG. 1 as follows: a source beam of coherent light, usually a laser 1, is passed through a beam splitter 2 producing two distinct beams: an object beam 7 and a reference beam 8. With the aid of lenses 3 and 4, each beam of coherent laser light is spread to form a wavefront of light. The object beam 7 wavefront is directed at a mirror 5 which reflects the wavefront onto the object 6. The currently accepted recording device, film 10, then receives the object beam 7 reflected from the object 6 and reference beam 8 and records the image as an interference pattern on photographic film.

The reflected illumination from the object is in the form of expanding spherical wavefronts, derived from the interaction of the coherent light wavefront and every point on the object, producing an irregular wavefront that contains certain information about the object. When the second beam, the reference beam 8, from the same coherent light source, is directed to the recording device without being reflected from the object, the two beams form an interference pattern on the film. This interference pattern is formed by the constructive and destructive interference of the object and reference beam wavefronts on the film. This interference pattern, as shown in FIG. 2, is comprised of intensity variations in the phases and amplitudes of the two wavefronts. In summary, the recording of an interference pattern is a hologram and subsequent reillumination of this interference pattern of the object and reference beams of coherent light is a holograph.

Holograms differ from conventional photography in two important ways. Conventional photography records an image of reflected incoherent visible light by focusing the image, through the use of a lens, on film. When developed this image is then visible to the naked eye using any standard non-coherent light source. A standard holographic recording uses no focusing device to form an image, but rather records the interference patterns of coherent light. When developed, a hologram produces a non-recognizable image when viewed by the naked eye under non-coherent light. The hologram can, however, be illuminated by a coherent light source (using a reference wavefront) reproducing the original objects wavefront from the interference pattern by means of diffraction, and when viewed this wavefront illusion which appears as if the original object is suspended in space.

An article by D. Gabor 161,777 (1948) and which appeared in Proceedings of the Royal Society, (London) A197,454 (1949) describes this type of optical reconstruction and state that images produced by this technique possess all the three-dimensional characteristics of the original object. Still further, holograms recorded on film can also be reilluminated using white light.

SUMMARY OF THE INVENTION

It is an object of this invention to use optical wave-length reconstruction techniques to produce real-time holograms.

Another object of the invention is to be able to transform a real-time hologram, by means of a transducing device and high speed computers, into a digital computer signal.

A further object of the invention is to provide the means by which this computer signal can be reconstructed by means of a transducing device to produce a hologram which can be seen visually to have the same three-dimensional characteristics of the original object, in continuous real-time.

A still further object of the invention is to provide the means by which a digital computer signal may be transmitted and received via electromagnetic radiation to produce a hologram.

An additional object of the invention is to provide the means by which this real-time hologram can be stored and reconstructed at any future point in time.

It is still another object of the present invention to provide a means for transmitting and reconstructing three dimensional images of solid, transparent or translucent small objects, large events such as plays, sporting events and concerts and objects of close and distant proximity and objects visible and invisible to the naked eye when used in conjunction with other technologies.

In keeping with the principles of the present invention, the objects are accomplished by a unique three-dimensional image transmitting and reconstruction system using optical wavelength reconstruction. This system includes a means for receiving a continuously changeable holographic interference pattern, a means for continuously creating a holographic interference pattern on the receiving means, a means for focusing the interference pattern on the input of the receiving means, a means for converting the received holographic interference pattern into transmittable signals, a means for receiving the transmittable signals, a means for continuously converting the transmittable signals back to the holographic interference pattern and a source of coherent light illuminating the holographic interference pattern on the converting means whereby the image of the three-dimensional object is reconstructed.

In addition, substantially all of the present invention can be created from relatively simple to use optical and electronic components such digital computers, LED's, LCD's, lenses, etc.

BRIEF DESCRIPTION OF THE DRAWINGS

The above-described principals and objects of the present invention will become more apparent with reference to the following figures in which like reference numerals denote like elements and in which:

FIG. 6 indicates the fiber optic bundle connected cable by cable to the transducing device, the output of which is then directed into a computer. The output of the computer is then directed into a transducing device, and then back into the fiber optic cable whose output is then reilluminated by coherent light to produce the holographic image;

FIG. 7 indicates an other possible variation in transducing devices that may be used;

DETAILED DESCRIPTION OF THE INVENTION

Figure 1:
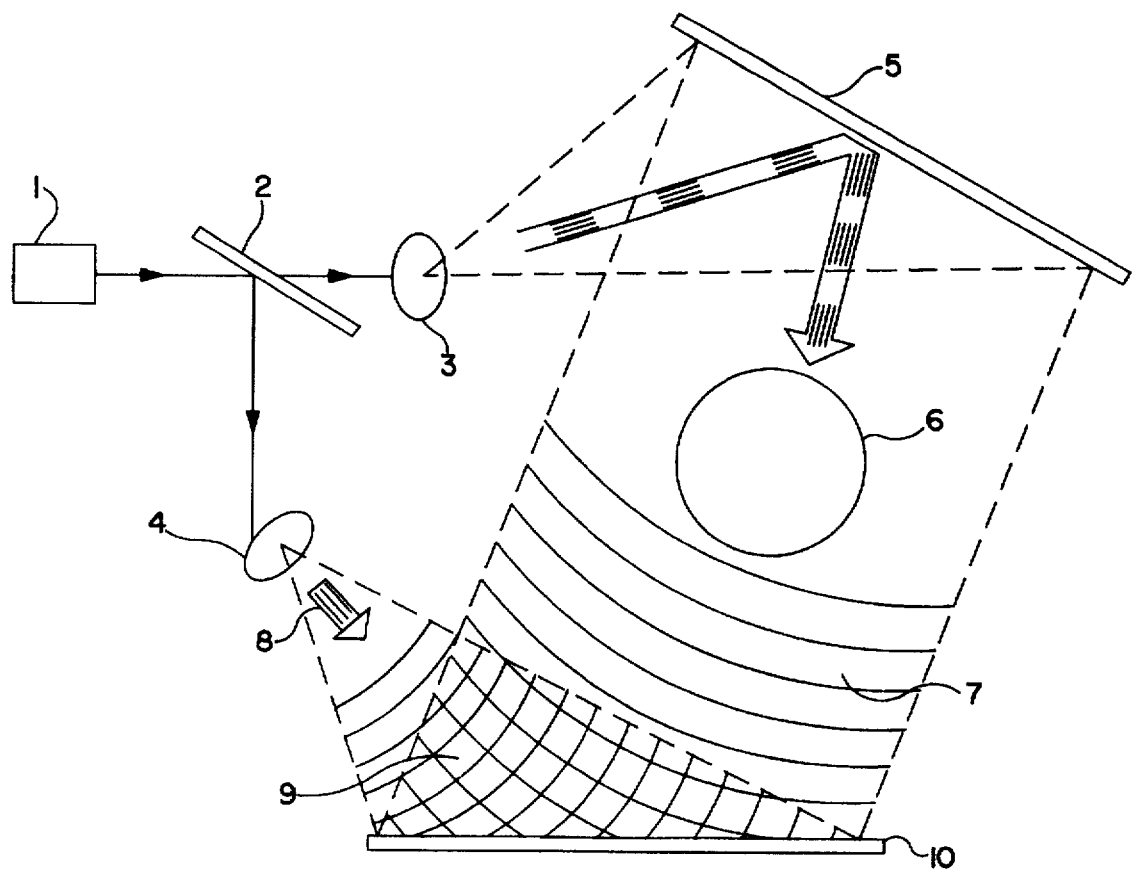
FIG. 1 shows one method of producing a hologram of the prior art.

As described in FIG. 1 using a laser 1, beam splitter 2, lenses 3 and 4, mirror 5, and object 6, an interference pattern 9 of light waves is created. If this interference pattern 9 were recorded on film 10 and illuminated under non-coherent light, it would look similar to FIG. 2 (depending upon the object used, the pattern would be individual and unique to it).

Figure 3A:
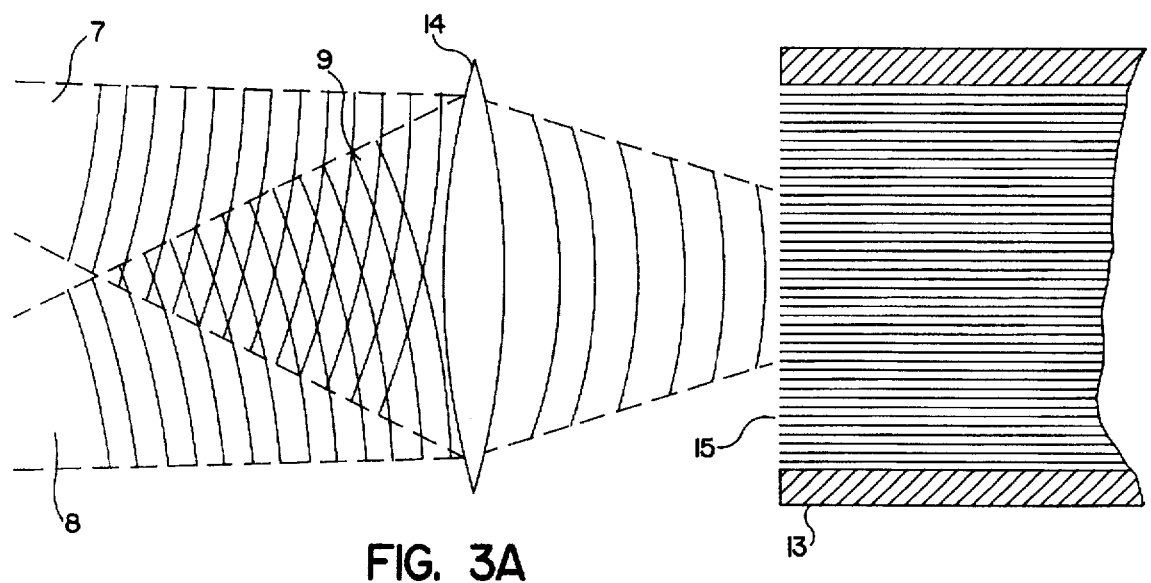
FIGS. 3A and 3B indicate a transducing process of converting the real-time hologram into a transmittable signal.
Figure 3B:
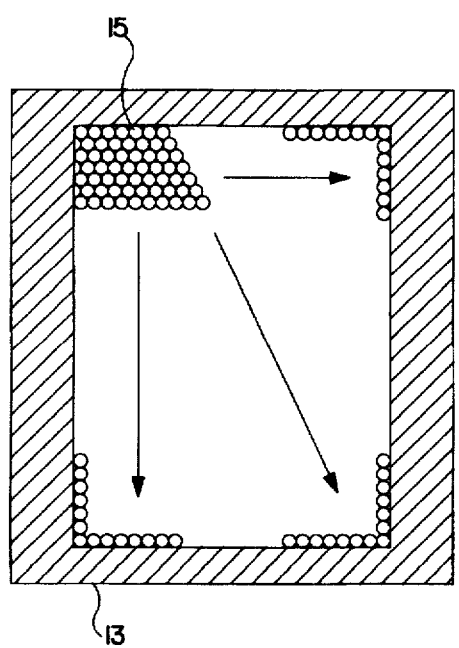

Instead of using film 10 to record (over a period of time) the interference pattern 9 as shown in FIG. 1, the present invention replaces the film 10 with the open ends 15 of fiber optic cables 13. For instance, if the hologram in the previous example were recorded on a square piece of film, this film would be replaced with a bundle 13 of thousands of open end fiber optic cables 15 and a lens 14 to focus the pattern on the end of the bundle 13 as shown in FIGS. 3A and 3B.

The use of a lens in the process before the fiber optic cable 13 assists the process by concentrating the holographic interference pattern onto the open ends 15 and in the reduction of a large image down to a smaller size image in proportion to the original object. Accordingly, the lens 14 can further assist in the size and scale relationships and would proportionally reduce the image to the size of the open ends 15 of the fiber optic cable 13. Still further, another lens 14' shown in phantom lines in FIG. 4 could be added at the output of the present invention for substantially the same purposes as it is utilized at the input.

Figure 2:
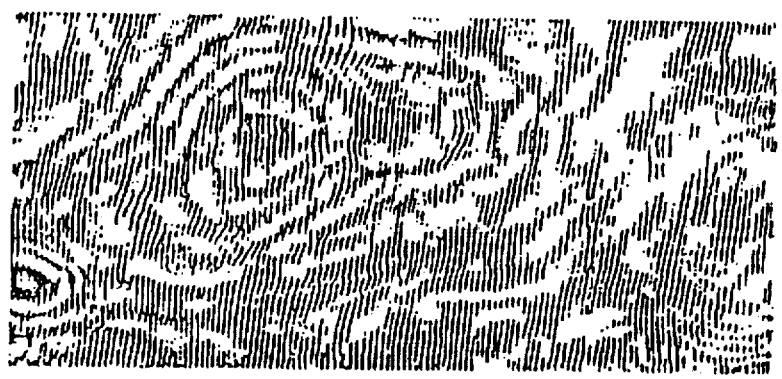
FIG. 2 indicates the interference patterns of a hologram under visible incoherent light and extreme magnification.

As seen in FIG. 2, an exposed piece of holographic film resembles "contour" patterns of an elevation map. Further magnification reveals that these "contour" patterns consist of tiny dots or fringes of either white or black. The size and amount of fiber optic cable fibers to be used within the bundle is to be set to capture each and every dot or fringe of black and white in the contour patterns.

This process is similar to that of printing photographic pictures. In the printing process, the picture, under magnification, consists of thousands of tiny black and white dots, which when viewed in the proper perspective create a picture. Similarly, television pictures are created by tiny black and white dots or pixels of light illuminated on a phosphorous screen. In both these processes, printing and television, the ability to recognize images is based upon tiny black and white dots, the amount of which and viewing distance from them determines the resolution of the picture.

The same principle is to be applied in this process. The scale (amount and size) of fiber optic cables used must be sufficient to capture each and every black and white dot or fringe created by the interference pattern of light. Also, the arrangement and alignment of the optics such as the laser and the objects can be made in any manner known to those of ordinary skill in the art for reflective or transmissive objects. Still further, the offset angle in process for producing the hologram can be set to any angle required by the size, scale and/or resolution of the component elements of the present invention and any type of laser (He-Ne, infrared, diode, etc.) may be utilized.

Figure 4:
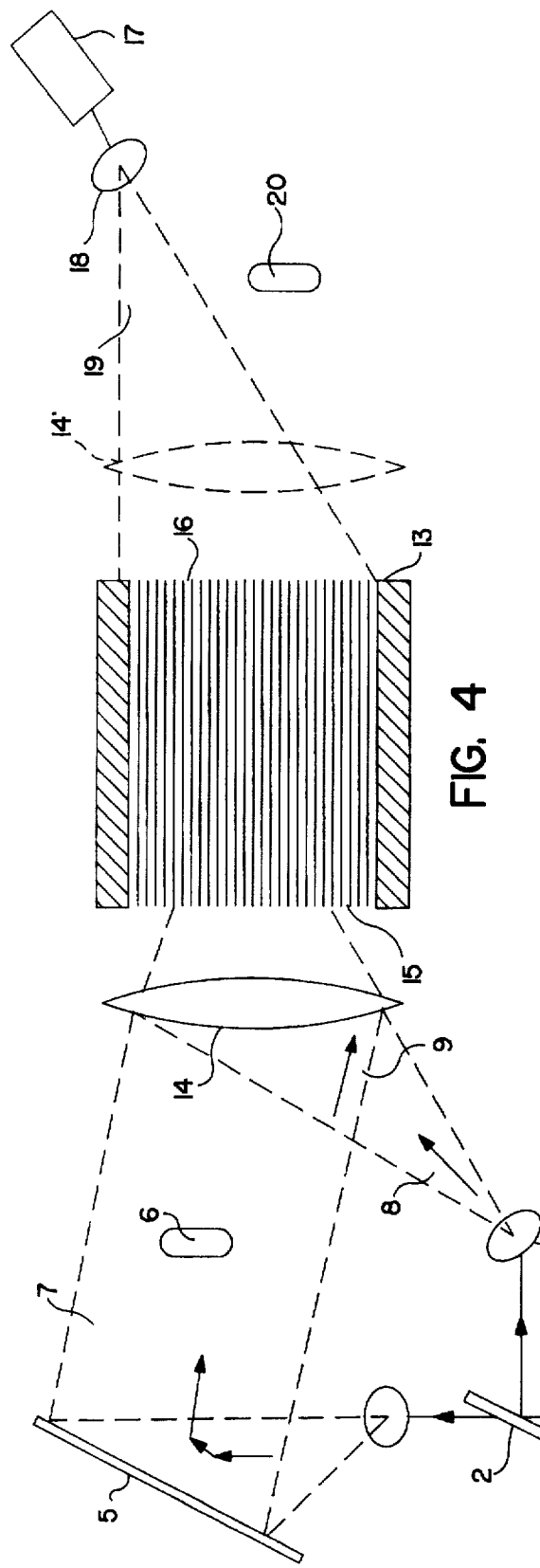
FIG. 4 shows this process in its simplest form. The interference pattern enters one side of the fiber optic bundle, is transmitted through the bundle, and then is reilluminated with coherent light.

Within the process, a length of fiber optic cables (bundle) 13 replaces a piece of film 10 used in "typical" holographic processes. FIG. 1 depicts such a "typical" process. FIG. 4 depicts this process in its simplest form.

Figure 13:
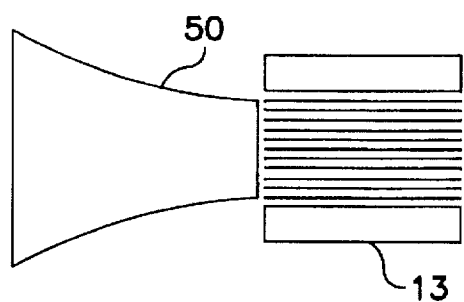
FIGS. 13, 14, 15(a) and 15(b) illustrate further enhancements of the present invention.

FIG. 4 shows that the interference pattern enters the fiber optic bundle 13 on side 15 after passing through lens 14 in the form of tiny dots of either light or darkness (white or black), and which reappears at side 16 of the fiber optic bundle 13 in the same pattern. This pattern when illuminated with a reference beam 19 of coherent laser light 17 will make an image of object 20 reappear, possessing all the three-dimensional characteristics of the original object. By means of the lens 14, the interference pattern on the bundle 13 can be resized, thus enlarging or reducing the pattern and the corresponding dots as required. Also, the lens 14 could be used to place the interference pattern at a distance which will appear to be optical infinity to eliminate the focused image from appearing with the interference pattern. Instead of the lens 14, a fiber optic taper 50 as shown in FIG. 13 could be placed in front of the bundle 13 to decrease the size of each pixel.

In the holographic process using film 10, the interference pattern takes time to accumulate onto the film 10, then the film is developed, and then it is reilluminated to recreate the hologram. In the present invention, there is no accumulation time, as the interference pattern goes directly into side 15 of the fiber optic bundle 13 and exits on side 16, and then is reilluminated at that time as shown in FIG. 4. There is no "lag" time, and therefore a real-time holographic image is produced.

Figure 5:
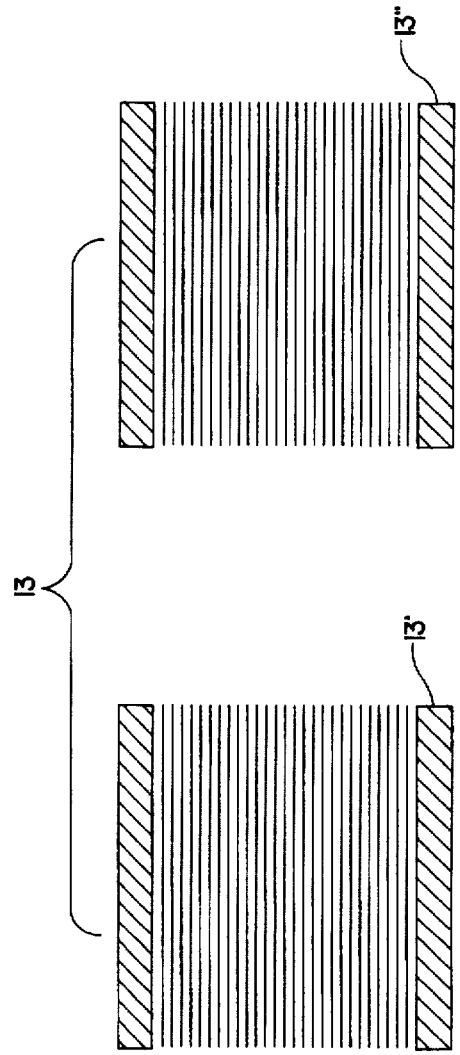
FIG. 5 illustrates the fiber optic bundle split into two pieces.

The first possible modification of this process is shown in FIG. 5. Here the fiber optic bundle 13 is split into bundles 13' and 13", adding sides 21 and 22 and additional processes are used as described below.

In FIG. 6, the "inside" portion of the fiber optic bundle 13', side 21 is then connected, cable by cable 23 to transducers 24 capable of converting light wave impulses into digital electrical pulses. This transducer is commonly used for example by the telephone companies to convert electrically generated telephone speech impulses into light waves for use in fiber optic cable transmission of telephone conversations, and then is reconverted into electrical impulses for use in standard telephones and generally comprises photo detectors such as photo-diodes or phototransistors.

These converted pulses at point 25 are then inputted into a computer 26 capable of recognizing and recording all the information coming from each and every cable in the fiber optic bundle at very high speeds. Such computers exist in the prior art for processing video images and only require certain obvious modifications. The output of the computer 27 is then directed at the transducers 28 which converts it back to light impulses at side 22. The transducers 28 can be any device capable of changing electrical signals to light such as light emitting diodes. These impulses reappear at side 16, exactly as they originally appeared at side 15, and when reilluminated with the coherent laser light 17, the three-dimensional holographic image appears.

In addition, it should be apparent that the analog to digital conversion and the digital to analog conversion can be accomplished utilizing a general purpose prior art digital computer or microprocessor using generally known software which exists in the prior art and includes an algorithm which performs the conversion function. While the computer 26 is described above as only recognizing, storing and outputting the interference pattern as digital data, it should be apparent that the computer 26 could be utilized to perform other functions such as those of lens 14, spatial filters and aperture stops. The computer 26 can also be used to enhance and detect the edges of the interference patterns, detect and enhance features, integrate and extract images, normalize the histogram, modify the threshold and contrast, automatic exposure and gain control, image compression and un-compression, image diagnostics, image convolutions, image manipulating, image simulations and image enhancements. Also, the computer 26 could be made utilizing multiple processors.

Possible variations in the type of transducers used include but are not limited to the following. In FIG. 7, the output of side 21 of the fiber optic bundle is directed at arrays of photodiodes 30 (similar to those used in television cameras) which are appropriate in scale and size to receive the output of the fiber optic bundle 23 and convert it to output digital electrical impulses 25 which a computer 26 is capable of recognizing and utilizing. Also, the output 27 of the computer 26 is directed at light emitting diodes (LED) 31 which are of appropriate scale and size to convert the output 27 of the computer 26 into usable light signals for the fiber optic bundle 13". The LED's 31 could also be small solid state lasers.

Figure 8:
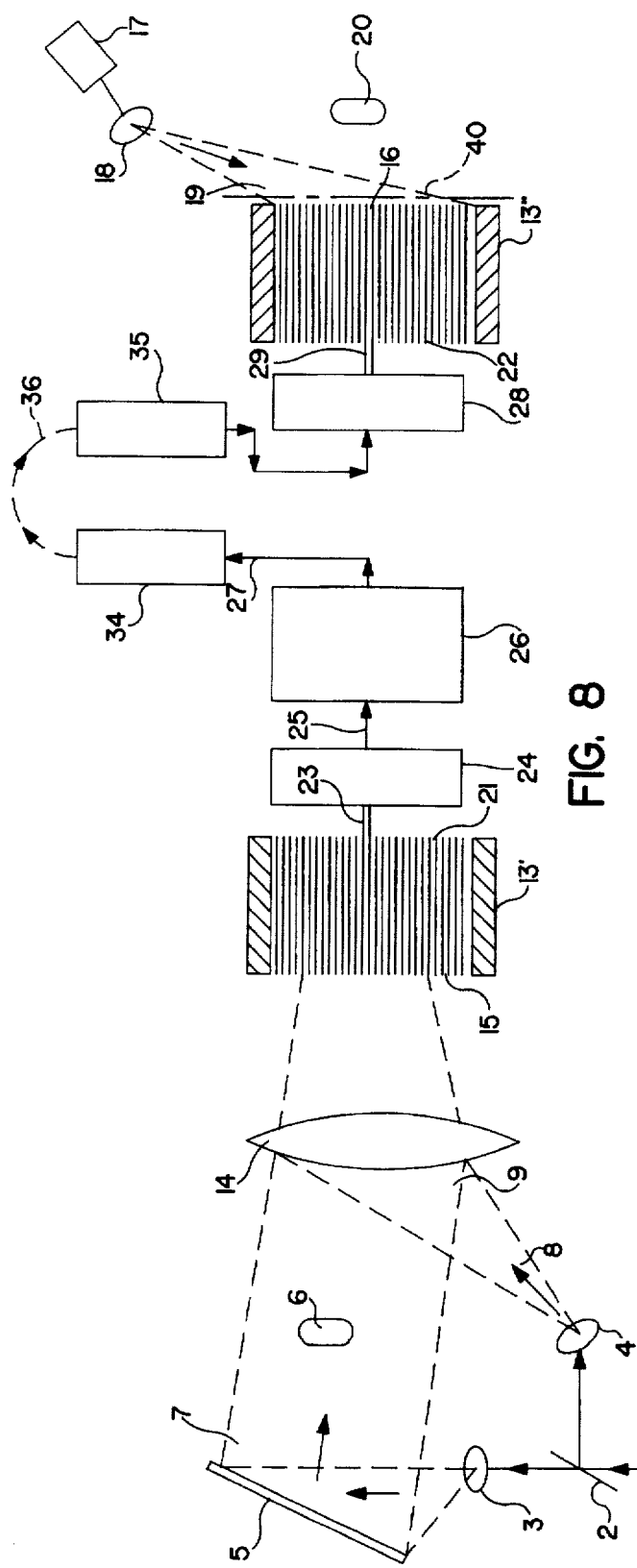
FIG. 8 is another embodiment illustrating the system.

A further modification of this process is depicted in FIG. 8. Here the digital computer signal output 27 is directed to a transmitter 34 for broadcast to various types of receiving devices 35 via transmission media 36. These may include but are not limited to satellites, multipoint distribution systems, or microwave systems.

An additional modification is when the output of side 21 of the fiber optic bundle is inputted directly into telephone fiber optic cables for transmission and reconstruction at the other end.

Figures 15A, 15B:
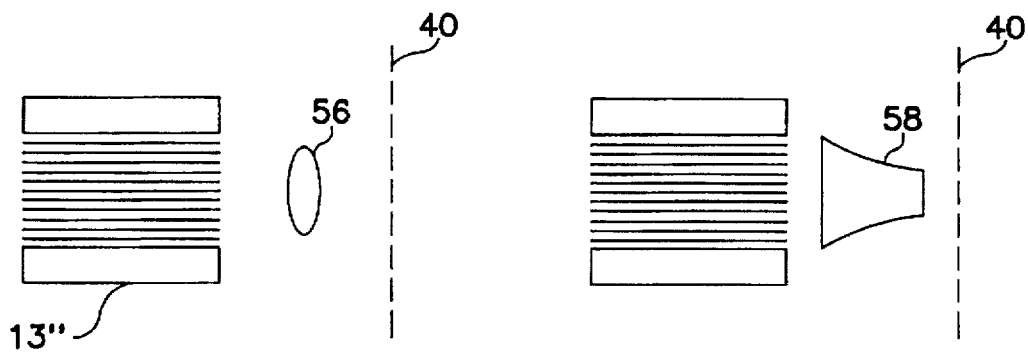

A still further modification to the present invention can be made at side 16 of the fiber optic bundle 13" shown in FIG. 8. In the process described previously, the light signals which appear at side 16 are reilluminated by a coherent laser light 17 to display the object. In this modification, the light signals which reappear at side 16 may be directed onto a surface or screen 40 which is shown in phantom lines of FIG. 8. The surface or screen 40 may be made from any translucent or transparent material such as a plastic, paper, etc. so long as the material can function as a diffractor. The laser light 17 will then be directed onto the surface or screen 40, which, acting as a diffraction grating for the fiber optic bundle 13" will redirect, reflect or bend the light waves in such a manner as to form the holographic image. The function of the surface or screen 40 will be to form a diffraction grating for redirecting the light signals emitted from the fiber optic cable 16 rather than for the purpose of accumulating or recording the light signals. Still further, the screen 40 is a diffraction screen which can be made out of most any type of material are constructed in any manner of ways to include porous silicon, superconductive films, spatial light modulator (SLM), a protein, an eidaphor projector, active or passive liquid crystal displays (LCD), and/or thermal plastic film and can be either reflective or transmissive. Also, the diffraction screen may be made from a flexible material so that it may be curved to provide a better viewing angle and/or better resolution. Still further, a lens 56 or fiber optic taper 58 as shown in FIGS. 15(a) and 15(b) can be inserted between output of bundle 13" and the screen 40 to reduce, enlarge or change the size of the fringe spacing and pixel sizes.

Figure 10:
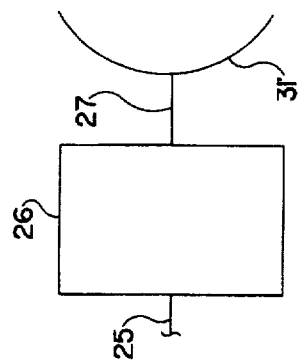
FIG. 10 is a partial view of FIG. 9 illustrating a flexible, curved D/A device.
Figure 9:
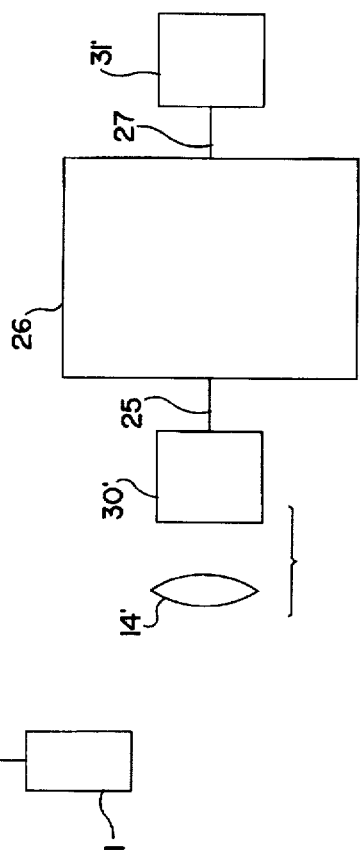
FIG. 9 is another embodiment illustrating the system of Applicant's invention.

Referring to FIG. 9, shown therein is another embodiment of the present invention. In this embodiment, it may be desirable to incorporate the analog to digital and the digital to analog conversion functions together with the functions of the fiber optic bundles. To achieve this end, the fiber optic bundles are entirely removed and the interference pattern created by the laser falls directly onto one surface of the analog to digital convertor 30'. The analog to digital convertor 30' can be an array of photodiodes as previously described or some other video device such as a charge coupled device (CCD) which is utilizable for video image to signal conversion. The output of the computer 26 is then directed to the digital to analog convertor 31' and this digital to analog convertor may be an array of light emitting diodes which can be used in conjunction with a translucent or transparent defractor screen as previously described or some other device such as a passive or active, reflective or transmissive liquid crystal display (LCD) and preferably a diffraction type LCD. Also, the digital to analog converter 31' may also be made of the same materials as screen 40 and flexible so that it can be shaped into a curve to provide better viewing angles and/or better resolution as is shown in FIG. 10.

With the digital to analog convert 31', the recreated interference pattern can be produced on one surface thereof and the laser light is directed onto or through the interference pattern to reconstruct the three-dimensional image.

Figure 11:
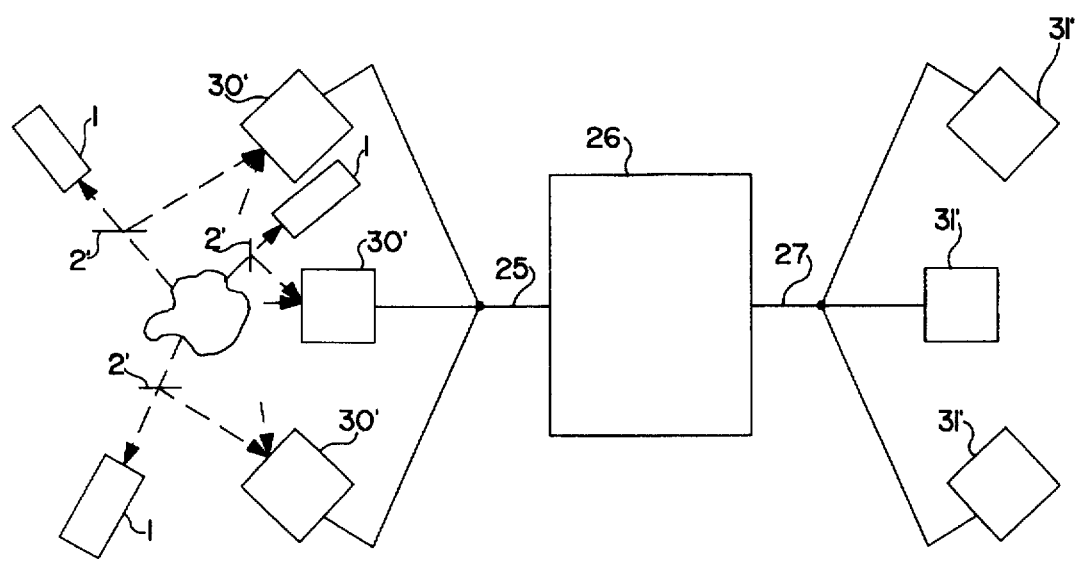
FIG. 11 is still another embodiment illustrating the use of multiple and/or multi-color systems.
Figure 14:
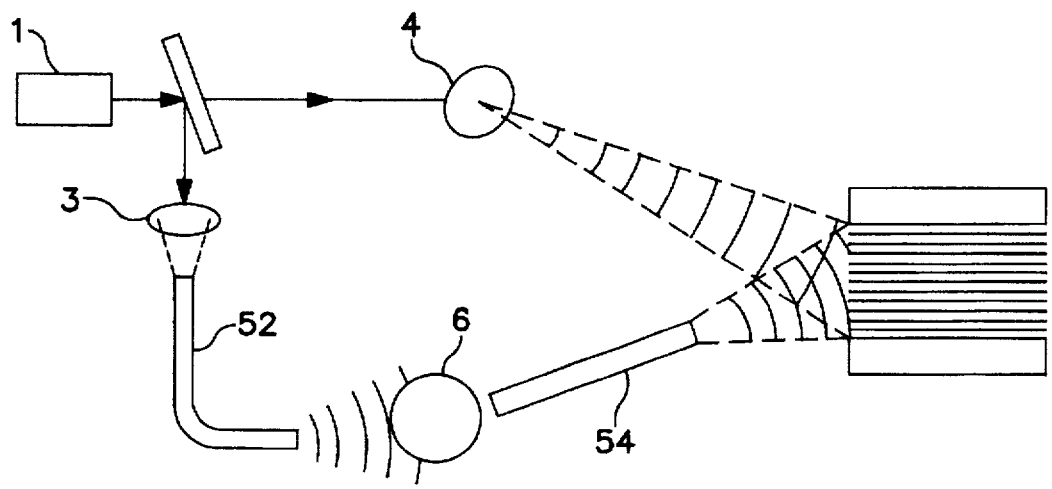

As shown in FIG. 11, the process of the present invention may be adapted to the use of multi-color and moving objects using multiple lasers, multiple A/D converts 30, multi-color lasers (red, green, blue), white light lasers, multiple or multilayer D/A converters 31' such as an LCD and multiple systems. For example, the tiny dots of light which are inputted into the fiber optic cables from the different multi-color lasers can be of different colors (red, green, blue) and intensities, as long as the remainder of the process in any system is adjusted to recognize the differences between colors. In addition, the multiple lasers could be placed about the object at different angles so as to receive a different interference pattern at a different location so as to produce a reconstructed three dimensional image which is better capable of being viewed from multiple angles. While the above system has been described as requiring the use of coherent light from a laser, it could also be implemented using incoherent light using techniques such as those used in white light holography. Alternately, the light from a single laser could be split instead of using a plurality of lasers or a single interference pattern could be optically split into a plurality of interference patterns and applied to a plurality of receiving means. Also, an optical mask could be used in conjunction with the lens 14 to filter out noise or reduce the pixel size of the interference pattern at the bundle 13. Additionally, a fiber optic bundle 52 as shown in FIG. 14 could be utilized to direct light onto the object 6 and also a bundle 54 could pick up the light from the object 6 and direct it onto the bundle 13 to form the interference pattern. Also, the display means need not be placed at the same angles as the receiving means so as to vary the reconstructed image. Still further, a plurality of low resolution and low cast display means (CCD 44) focused on the same spot can be used to enhance resolution.

Figure 12:
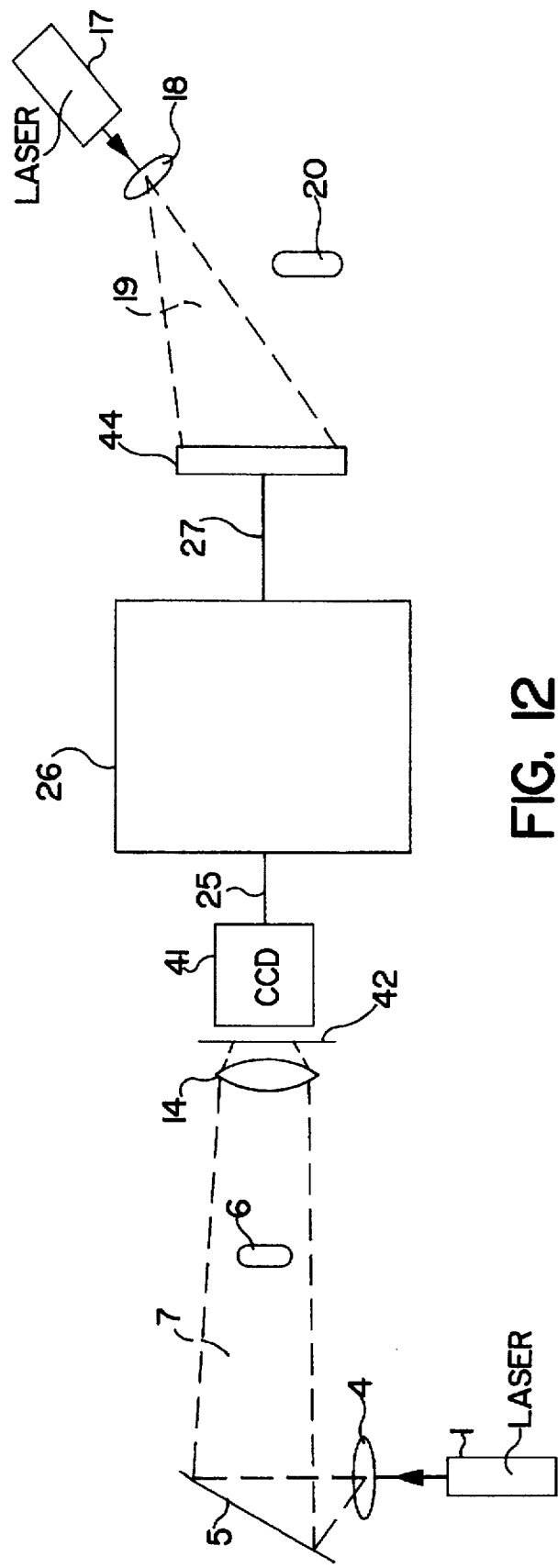
FIG. 12 is yet another embodiment of the present invention.

Referring to FIG. 12, shown therein is another embodiment of the present invention. In this embodiment of FIG. 12, like elements are given like reference numerals and by the addition of Element 42 to be described later, the device is further simplified.

In particular, in the device of FIG. 12, a charge coupled device video camera 41 is utilized as the analog digital converter described in conjunction with FIG. 9. In other words, it converts the optical input signal to the camera into digital electrical signals which are transmitted to the computer 26. At the output of the computer 26, the signal is directed to a liquid crystal display 44 which functions as the digital to analog converter described in conjunction with FIG. 9. In particular, this liquid crystal display 44 is preferably a high resolution, active matrix liquid crystal display. Still further and in front of the input of the charge coupled device camera 41 is provided a piece of exposed and developed film with a very special image provided thereon. In particular, the image provided on the film 42 is an image of the reference beam. As a result, the reference beam can be eliminated from the input of the device of FIG. 12 and only an object beam 7 is required.

In operation, the object beam from the laser 1 illuminates the object 6 and the light passes through the lens 14 wherein it is focused onto the film 42 which is provided in front of the input of the CCD camera 41. The object beam passes through the film 42 and since the reference beam is optically recorded on the film 42, the spatial frequencies of the reference beam are added to the object beam and it is this optical signal which essentially comprises an interference pattern which is presented to the input of the CCD camera 41. The output of the camera 41 is provided to the computer 26 wherein it is either processed, stored or transmitted on in a similar manner as described in prior embodiments. The signal is then provided to the LCD 44 which is eliminated with a reference beam 19 to recreate the image 20.

In addition to the embodied described above in FIG. 12, it would be also possible that instead of using a film 42 which has been irradiated with the reference beam and then developed so that the spatial frequencies of the reference beam are contained therein, it would also be possible to make the device of FIG. 12 operate by eliminating the film 42 and electrically processing the signal from the camera 41 in the computer 26 to add in the spatial frequencies or signal which is representative of the reference beam or beams. To achieve this end, one need record in memory of the computer 26 a reference beam signal at the desired angle and location at the input of the camera 41. Then the object 6 would be placed back within the object beam 7 and the device operated so that the object beam then received by the camera 41 would be processed together with the memorized reference beam within the computer 26 in order to create a digital signal which is the equivalent of the digital signal for the interference pattern which would normally have appeared at the input of the camera 41 if one utilized both an object beam and a reference beam. The software to accomplish this end is within the skill level of one of ordinary skill.

In addition, since this process occurs in real-time, the objects used to produce the holographic images may be of any type, including human subjects, and all their movements. This is possible since any movement will just change the interference pattern which in real time is just processed through the system to produce the virtual image. This facilitates the use in holo-graphic television, telephones, stage, sports, meetings, etc.

It should also be mentioned that since this process includes the conversion of light waves into digital electrical signals which can be entered and outputted via computer, that it will also be possible, by means of massive computer storage, to record these signals for future use. This means that at any point in time these recorded signals can be outputted from the computer to a transducer device and reconstructed into a virtual image, stationary or moving.

This ability to record and store this information will also facilitate the formation of artificial holograms, based upon information in the computer's storage. Combinations and manipulations of this information will be possible using computer programs similar to the CAD, mathematical manipulation, drawing and painting software which are in existence and could be modified by those of ordinary skill in the art to perform this function, producing an unlimited variety of possible holographic images based upon the information stored. In addition, the information could also be manipulated passively by interweaving, inverting, reversing, cascading, etc. the fibers of the fiber optic bundle.

While the above has been described in terms of laser light, it would also be possible to use any source which has wavefronts and forms interference patterns such as microwaves, sound waves and magnetic waves. In addition, an input means such as a CCD camera could be replaced with other forms of electronic image data which has been converted by software or other means to an interference pattern. Original sources for such image data could be an ultrasonic or MRI scan.

It should be clear that while the form and processes of my invention herein shown and described constitutes the preferred design and uses of the invention, it is not intended to illustrate all of the equivalent forms or ramifications thereof. It will be obvious that modifications may be made without departing from the spirit or scope of this invention, and it is my intention to cover all such changes not detailed here that fall within the true spirit and scope of this invention.

I claim:

1. A holographic apparatus for continually sensing, transmitting and reconstructing a three-dimensional image comprising;

a means for receiving a continuously changeable holographic interference pattern;

a means for continuously creating a changeable holographic interference pattern which is representative of a three-dimensional image on said receiving means;

a means for converting and transmitting the received holographic interference patterns as digital signals;

a means for continuously recreating said continuously changeable holographic interference pattern from said digital signals;

a source of radiant energy illuminating said recreated changeable holographic interference pattern on said means for continuously recreating said continuously changeable holographic interference pattern; and wherein said means for continuously recreating comprises a liquid crystal display and said liquid crystal display is flexible and shapable into a curved surface;

whereby the sensed three-dimensional image is reconstructed.

2. A holographic apparatus for continually sensing, transmitting and reconstructing a three-dimensional image comprising:

a plurality of means for receiving a continuously changeable holographic interference pattern;

a plurality of means for continuously creating a changeable holographic interference pattern which is representative of a three-dimensional image on said receiving means;

a means for transmitting the received holographic interference pattern;

a means for continuously recreating said continuously changeable holographic interference pattern from said transmitted holographic interference pattern;

a source of radiant energy illuminating said recreated changeable holographic interference pattern on said means for continuously recreating said continuously changeable holographic interference pattern; and wherein said means for continuously recreating comprises a liquid crystal display;

whereby the sensed three-dimensional image is reconstructed.

3. A holographic apparatus according to claim 2, wherein said plurality of means for continuously creating a changeable holographic interference pattern comprises a plurality of lasers.

4. A holographic apparatus according to claim 3, wherein each of said plurality of lasers emits a different colored light.

5. A holographic apparatus according to claim 2, further comprising a means for splitting the interference pattern into a plurality of interference patterns and applying one of said plurality of interference patterns to each of the plurality of means for receiving.

6. A holographic apparatus according to claim 2, further comprising a plurality of means for continuously recreating said continuously changeable holographic interference pattern.

7. A holographic apparatus according to claim 6, wherein said plurality of means for recreating said continuously changeable holographic interference pattern comprises a plurality of low resolution display means focused on the same point.

8. A holographic apparatus for continually sensing, transmitting and reconstructing a three-dimensional image comprising:

a means for receiving a continuously changeable holographic interference pattern;

a means for continuously creating a continuously changeable holographic interference pattern which is representative of a three-dimensional image on said receiving means;

a means for converting and transmitting the received holographic interference pattern as digital signals;

a means for continuously recreating said continuously changeable holographic interference pattern from said digital signals;

a source of radiant energy illuminating said recreated changeable holographic interference pattern on said means for continuously recreating said continuously changeable holographic interference pattern; and wherein said means for transmitting the received holographic interference pattern comprises a computer, said computer including means for manipulating the received holographic interference pattern; and whereby the sensed three-dimensional image is reconstructed.

9. A holographic apparatus according to claim 8, wherein said means for receiving a continuously changeable holographic interference pattern comprises a charge coupled device.

10. A holographic apparatus according to claim 9, wherein said means for continuously recreating said continuously changeable holographic interference pattern comprises a liquid crystal display coupled to the output of said computer.

11. A holographic apparatus for continually sensing, transmitting and reconstructing a three-dimensional image comprising:

a means for receiving a continuously changeable holographic interference pattern;

a plurality of means for continuously creating a changeable holographic interference pattern which is representative of a three-dimensional image on said receiving means;

a means for transmitting the received holographic interference pattern;

a means for continuously recreating said continuously changeable holographic interference pattern from said transmitted holographic interference pattern;

a source of radiant energy illuminating said recreated changeable holographic interference pattern on said means for continuously recreating said continuously changeable holographic interference pattern; further comprising:

a lens provided between the means for continuously creating a changeable holographic interference pattern and a means for receiving an entire continuously changeable holographic interference pattern for resizing the entire changeable holographic interference pattern on said means for receiving; and a transmissive film means having recorded thereon a pattern of a reference beam and provided between said lens and said means for receiving said holographic interference pattern; and wherein said means for creating a changeable holographic interference pattern comprises a laser for supplying an object beam;

whereby the sensed three-dimensional image is reconstructed.

12. A holographic apparatus according to claim 11, wherein said means for receiving a continuously changeable holographic interference pattern comprises a charge coupled device.

13. A holographic apparatus according to claim 12, wherein said means for continuously recreating said continuously changeable holographic interference pattern comprises a liquid crystal display.

14. A holographic apparatus for continually sensing, transmitting and reconstructing a three-dimensional image comprising:

a means for receiving a continuously changeable holographic interference pattern;

a means for continuously creating a changeable holographic interference pattern which is representative of a three-dimensional image on said receiving means;

a means for converting and transmitting the received holographic interference pattern as digital signals;

a means for continuously recreating said continuously changeable holographic interference pattern from said digital signals;

a source of radiant energy illuminating said recreated changeable holographic interference pattern on said means for continuously recreating said continuously changeable holographic interference pattern; and wherein said means for transmitting the received holographic interference pattern comprises a computer, said computer including means for memorizing a signal corresponding to reference beam; and whereby the sensed three-dimensional image is reconstructed.

15. A holographic apparatus for continuously sensing, transmitting and reconstructing a three-dimensional image comprising:

a means for receiving a continuously changeable holographic interference pattern;

a means for continuously creating a changeable holographic interference pattern which is representative of a three-dimensional image on said receiving means;

a means for transmitting the received holographic interference pattern;

a means for continuously recreating said continuously changeable holographic interference pattern from said transmitted holographic interference pattern;

a source of radiant energy illuminating said recreated changeable holographic interference pattern on said means for continuously recreating said continuously changeable holographic interference pattern; and a lens provided between said means for continuously recreating said continuously changeable holographic interference pattern and said source of radiant energy for resizing said entire continuously changeable holographic interference patterns;

whereby the sensed three-dimensional image is reconstructed.

16. A holographic apparatus for continually sensing, transmitting and reconstructing a three-dimensional image comprising:

a means for receiving a continuously changeable holographic interference pattern;

a means for continuously creating a changeable holographic interference pattern which is representative of a three-dimensional image on said receiving means.

a means for transmitting the received holographic interference pattern;

a means for continuously recreating said continuously changeable holographic interference pattern from said transmitted holographic interference pattern;

a source of radiant energy illuminating said recreated changeable holographic interference pattern on said means for continuously recreating said continuously changeable holographic interference pattern; and wherein a tapered fiber optic bundle provided between the means for recreating the continuously changeable holographic interference pattern and said source of radiant energy for resizing said entire interference pattern;

whereby the sensed three-dimensional image is reconstructed.

17. A holographic apparatus for continually sensing, transmitting and reconstructing a three-dimensional image comprising:

a means for receiving a continuously changeable holographic interference pattern;

a means for continuously creating a changeable holographic interference pattern which is representative of a three-dimensional image on said receiving means;

a means for converting and transmitting the received holographic interference pattern as digital signals;

a means for continuously recreating said continuously changeable holographic interference pattern from said digital signals;

a source of radiant energy illuminating said recreated changeable holographic interference pattern on said means for continuously recreating said continuously changeable holographic interference pattern; and wherein said means for converting and transmitting the received holographic interference pattern further comprises a computer for receiving and storing said digital signals; and whereby the sensed three-dimensional image is reconstructed.

* * * * *